United States Patent [19]

Hajdu et al.

[11] 4,074,706
[45] Feb. 21, 1978

[54] SOLAR COLLECTOR HAVING SELECTIVE FILM OF IMPROVED STABILITY TO LIQUID WATER CONDENSATE

[75] Inventors: Juan Hajdu, Orange; Raymond A. Sosnowski, Bridgeport, both of Conn.

[73] Assignee: Enthone, Incorporated, West Haven, Conn.

[21] Appl. No.: 600,344

[22] Filed: July 30, 1975

[51] Int. Cl.² ............... F24J 3/02; C23F 7/02; C23F 17/00
[52] U.S. Cl. ................ 126/271; 148/6.14 R; 148/6.16; 148/6.2
[58] Field of Search ........... 148/6.2, 6.16, 6.14 R; 126/271

[56] References Cited

U.S. PATENT DOCUMENTS

| 2,437,441 | 3/1948 | Rogers | 148/6.15 R |
|---|---|---|---|
| 2,460,896 | 2/1949 | Meyer | 148/6.14 R |
| 2,481,854 | 9/1949 | MacMahon | 148/6.14 R |
| 3,198,672 | 8/1965 | De Hart | 148/6.14 R |
| 3,837,929 | 9/1974 | Caule | 148/6.16 |
| 3,929,122 | 12/1975 | Alkasab | 126/271 |

OTHER PUBLICATIONS

Fishlock, *Metal Colouring,* Robert Draper Ltd.: Teddington, England, 1962, pp. 194–195.

*Primary Examiner*—Harris A. Pitlick
*Attorney, Agent, or Firm*—R. J. Drew; E. J. Schaffer

[57] ABSTRACT

Solar collector including a copper or copper alloy base and a selective solar heat energy-absorptive coating or film of improved stability to liquid water on the base. The selective film is characterized by having a solar absorptivity of 0.90 or higher, infrared emissivity no more than 0.20, and a stability such that its selectivity is not significantly reduced after contact with liquid water condensate over a prolonged, cumulative, non-continuous time in excess of 15,000 hours.

30 Claims, 3 Drawing Figures

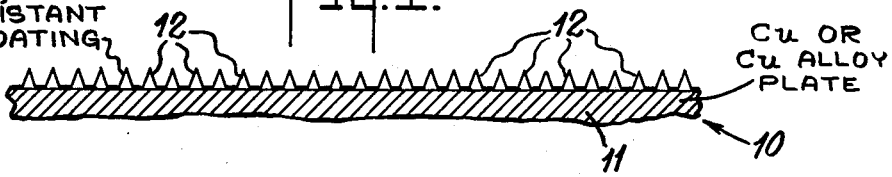
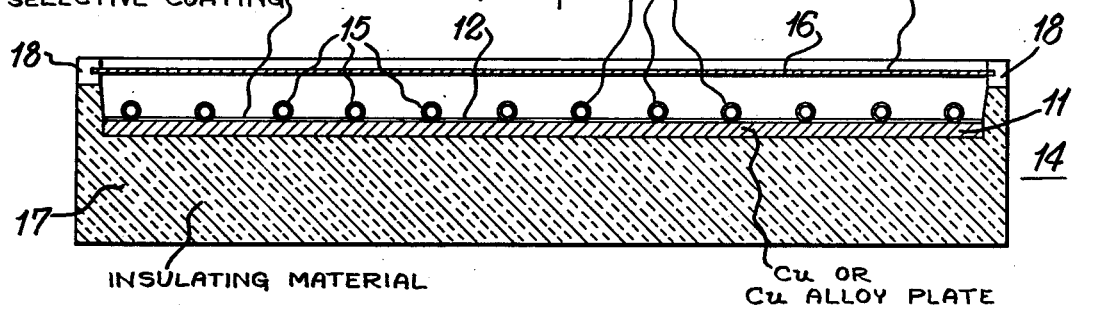
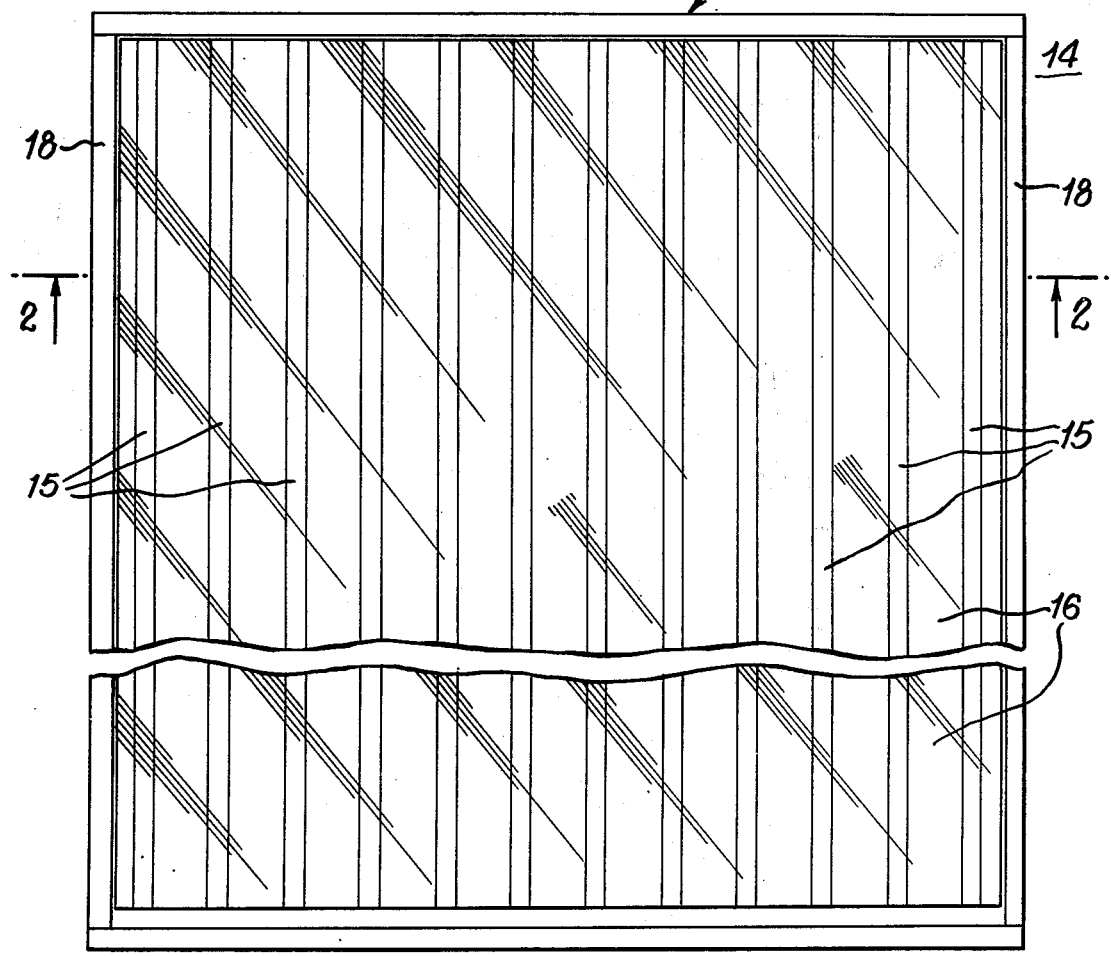

SOLAR COLLECTOR HAVING SELECTIVE FILM OF IMPROVED STABILITY TO LIQUID WATER CONDENSATE

BACKGROUND OF THE INVENTION

1. Field of the Invention

This invention relates to solar collectors and more particularly to a new and improved solar collector having a selective film of improved stability to liquid water.

2. Description of the Prior Art

It is well recognized that the fossil fuels of the world are being depleted. Indeed in certain oil-producing countries, the known reserves of oil are of quite limited magnitude. It would therefore appear of a high level of importance to utilize the energy of the sun, i.e. solar energy, to the extent we feasibly can to meet our energy requirements. Solar energy could, in theory, supply all of the energy requirements of this country.

Considerable research and experimentation has been carried out heretofore in the field of solar thermal energy conversion, and the technology of solar thermal energy conversion is fairly well advanced. One of the most important of a number of fairly recent discoveries in this field that have significantly improved the efficiency of solar thermal energy collectors is the use of "selective" surfaces, which are also referred to as spectrally selective surfaces. A surface that is both a good absorber of solar radiation and a poor emitter of infrared radiation is said to be "selective" or spectrally selective. A selective surface can significantly improve the thermal efficiency of solar thermal energy collectors or solar heat collectors. It is essential that the selective surface be stable or durable under the conditions encountered in the operation of solar heat collector.

Prior art selective surfaces suffer from a stability or durability problem, in that liquid water contacting the selective surfaces of the solar collectors when the collector box is not sealed, such as the water formed by the condensation of moisture from the air within the collector box in the cooler temperatures of evening, detrimentally changes the thickness of the selective copper oxide coating on the copper panel or flat plate surface resulting in an undesirable, considerable reduction in the selectivity of the black coating. Consequently, the solar absorptivity of the selective coating of the collector is considerably lowered and usually to an undesirable value below 0.90 and the thermal emissivity of the selective coating is considerably increased and usually to an undesirable value above 0.20. Such lack of desired stability of the selective coating to contact with water is especially a problem, when the selective coating or film is a black copper oxide (CuO) coating or film on a copper or copper alloy substrate and is produced by contacting the substrate with a prior art aqueous blackening solution comprising an oxidizing agent for the copper such as an alkali metal chlorite, and caustic soda.

U.S. Pat. Nos. 2,364,993 and 2,460,896 disclose the deposition of black coatings or films on copper and copper alloy surfaces by immersing the surface in a bath comprising an aqueous solution of alkali metal hydroxide, e.g. caustic soda, and sodium chlorite or potassium chlorite. U.S. Pat. No. 2,481,854 also discloses the blackening of surfaces of copper and coppeer alloy by contacting the surface with an aqueous solution comprising sodium chlorite or potassium chlorite, an alkali metal hydroxide, e.g. sodium hydroxide. The chlorite utilized in preparing the blackening solution is uniformly fixed in the water of hydration of the alkali metal hydroxide. The publication entitled "Spectral and Directional Thermal Radiation Characteristics of Selective Surfaces for Solar Collectors" by D. K. Edwards, J. T. Gier, K. E. Nelson and R. D. Roddich, presented to the United Nations Conference on New Sources of Energy, Apr. 20, 1961, discloses that promising low temperature collector surfaces appear to be copper or steel treated by the commercial "EBONOL" processes. This last-mentioned publication also discloses that commercial chemical dip treatments of copper and steel are shown to give selective characteristics desirable for low temperature collectors such as solar water heaters, and that a copper surface dipped 5 minutes in "EBONOL" C blackener solution at 175° F. produced a coating on the surface having a solar absorptivity of 0.91 and a thermal emissivity of 0.16 for collectors in space.

Prior art solar energy collectors and heaters are disclosed by U.S. Pat. Nos. 1,425,174; 1,888,620; 1,889,238; 1,971,242; 2,202,756; 2,208,789; 2,931,578; 1,034,475; 2,553,307; 3,176,678 and 629,122.

SUMMARY OF THE INVENTION

The solar collector of the present invention comprises a base or substrate of copper or copper base alloy, and a stable, selective, solar heat energy-absorptive coating on the base. This selective, solar heat energy-absorptive coating has been rendered stable by contacting the selective, solar heat energy-absorptive coating on the base with a chromic acid solution for a time sufficient to impart to the selective coating a stability such that its selectivity is not significantly reduced after contact with liquid water, ordinarily liquid water condensate, over a prolonged, cumulative, noncontinuous time in excess of 1600 hours.

The stable, selective, solar heat energy-absorptive coating on the base, is characterized by having a good or high solar absorptivity, usually of 0.90 or higher, and a poor or low infrared emissivity, usually no more than 0.20. Further, the stability of this coating is such that it ordinarily retains its high solar absorptivity of 0.90 or higher and its low thermal emissivity of no more than 0.20 after the contact with the liquid water over such prolonged period in excess of 1600 hours.

The temperature of the chromic acid solution during the contacting of the selective, solar heat energy-absorptive coating on the base to render the coating stable, can be within the range of room temperature to the boiling temperature of the chromic acid solution.

In a specific embodiment, the selective, solar heat energy-absorptive film or coating of the solar collectors herein is prepared by a process comprising contacting the copper or copper alloy base, with a hot aqueous solution comprising an oxidizing agent capable of oxidizing copper to cupric oxide, an alkali, and an aqueous liquid, usually water, for a time sufficient to obtain the selective coating or film on the base having the solar absorptivity of 0.90 or higher and the infrared emissivity no more than 0.20.

It is to be understood, however, that the selective, solar heat energy-absorptive coating or film of the solar collectors of this invention can be provided on the copper or copper base alloy by any suitable process, method or procedure.

More specifically, the aqueous solution of the aforementioned specific embodiment for producing the selective film on the copper or copper alloy surface, for example the copper or copper alloy flat plate or sheet surface and, if desired, on the surfaces of the metallic tubes, when utilized, adapted to contain the heat transfer liquid, such as the copper or copper alloy water tubes, is an aqueous blackening solution comprising an alkali metal chlorite as the oxidizing agent, an alkali metal hydroxide as the alkali, and water. The copper or copper alloy surface is contacted with such aqueous blackening solution comprising the alkali metal chlorite, alkali metal hydroxide, and water while the solution is hot, and for a time sufficient to obtain the selective film or coating on the surface having the solar energy absorptivity of 0.90 or higher and the thermal emissivity of no more than 0.20. The stabilizing treatment of the selective coating by contacting same with the chromic acid solution is then carried out as previously disclosed herein.

The oxidizing agent constituent of the aqueous solution for producing the selective film on the copper or copper alloy can be any suitable oxidizing agent capable of oxidizing copper to cupric oxide. We have obtained good results in blackening the surfaces of copper and copper alloys with use of an alkali metal chlorite, e.g. sodium chlorite or potassium chlorite, as the oxidizing agent. The alkali constituent of the selective-film producing aqueous solution is ordinarily caustic alkali, i.e. an alkali metal hydroxide, e.g. sodium hydroxide or potassium hydroxide. The selective film or coating produced by this aqueous solution is a black coating which may be light, medium or deep black. This coating may also be of another dark color, such as, for example, dark brown.

By "copper alloy" as used herein is meant a copper base alloy containing more than 50% by weight copper and is exemplified by copper base alloys containing, by weight, from 65% to more than 99% by weight copper. Specific examples of such copper base alloys are: red brass, 85% Cu 15% Zn; yellow brass, 65% Cu 35% Zn; admiralty brass, 71% Cu 28% Zn 1% Sn; leaded bronze, 89% Cu 9.25% Zn 1.75% Pb; and beryllium copper, Cu 2% Be 0.25% Co or 0.35% Ni. The terms "selective" and "selectivity" are used herein to mean a surface or surfaces of a coating or film that is a good absorber of solar radiation and a poor emitter of infrared radiation, as exemplified by a solar absorptivity of 0.95 and an infrared emissivity of 0.05.

In a specific embodiment of the complete method for preparing the stable, selective coating or film herein, the copper or copper alloy surface, for example, copper or copper alloy surfaces of plates or sheets destined to be solar collector panels, and, if desired, copper or copper alloy water tube surfaces, if not already clean, are cleaned by immersion for typically 3 minutes in an alkaline cleaner liquid at elevated temperature of typically about 180° F. and obtained by admixing "ENPLATE" 453 cleaner concentrate with water, in amount sufficient to form the alkaline cleaner liquid of about 50% by volume cleaner concentrate concentration. The panels are then water rinsed. The clean copper or copper alloy panels are then immersed in a deoxidizer liquid for typically 1-3 minutes at room temperature of the liquid and obtained by admixing "ENPLATE" AD 482 deoxidizer concentrate in water in amount sufficient to form the deoxidizer liquid of about 30% by volume deoxidizer concentrate concentration. The panels and tubes, when utilized, are then water rinsed.

The thus-treated clean copper or copper alloy plates and tubes, when utilized, are then immersed in, or otherwise contacted with, a blackener solution comprising 1½ lbs. of "EBONOL" C blackener concentrate per gallon of water, for about 1 to 10 minutes at a solution temperature in the range of about 140° F. to about 220° F. The blackener concentrate contains a mixture of an alkali metal hydroxide, e.g. sodium hydroxide and an alkali metal chlorite, e.g. sodium chlorite. A black or dark film or coating of thickness within the range of about 0.01 mil to about 0.5 mil is thereby formed on the copper or copper alloy surface. This thickness within the about 0.01 mil to about 0.5 mil thickness range is important for the reasons that if the black or dark film is significantly thinner than 0.01 mil, undesirable heat radiation occurs, and if the black or dark film is significantly thicker than 0.5 mil, excessive thermal emissivity occurs. The panels are then water rinsed.

The thus-treated, blackened copper or copper alloy surface or surfaces are then immersed in, or otherwise contacted with a chromic acid solution which is a solution of chromic anhydride, i.e. $CrO_3$, in a suitble liquid solvent, ordinarily an aqueous liquid solvent such as water. A suitable chromic acid solution for use herein contains typically 10 lbs. of $CrO_3$ per 100 gallons of solvent such as water. The blackened copper or copper alloy plates and tubes, when utilized, are maintained in contact with the chromic acid solution at a temperature in the range of room temperature to boiling temperature of the solution for a time period sufficient to render the selective, black coating on the copper or copper alloy surface or surfaces stable. The usual contact time of the blackened copper or copper alloy surfaces with the chromic acid solution to render the selective, blackened copper or copper alloy surfaces stable is about 10 to about 30 seconds at a temperature of the chromic acid solution of about 130° F.

Although it is not known with certainty, it is believed the chromic acid treatment of the selective, black or dark coating or film renders the same stable by inhibiting the migration and leaching out of copper ions from the copper oxide coating or film when contacted with liquid water. When this migration and leaching of copper ions occurs, the thickness of the black or dark copper oxide coating is undesirably changed and apparently reduced, resulting in the selectivity of the black coating being undesirably lowered. The chromic acid solution contacting treatment of the selective, black or dark coating film, by inhibiting this migration and leaching of the copper ions from the copper oxide coating, prevents or at least minimizes or inhibits this undesirable change and reduction of thickness of the copper oxide coating.

In tests involving prolonged contact to moisture of panels which had been subjected to the post-blackening treatment with chromic acid solution in accordance with this invention and also panels which had not been subjected to the chromic acid solution treatment after the blackening in accordance with this invention, both types of panels were placed in a humidity cabinet and held therein for 200 hours at 100% relative humidity. The panels which had been blackened and then subjected to treatment with chromic acid solution in accordance with this invention showed no change in the thickness of their black films after removal from the cabinet. The panels which had been blackened but not subjected to the chromic acid solution treatment in accordance with this invention, showed a material reduction in thickness of their black coatings after removal from the cabinet and a material lowering of the selectivity of their black coatings.

BRIEF DESCRIPTION OF THE DRAWINGS

FIG. 1 is an enlarged, schematic cross-sectional view, partially broken away, of a solar collector of this invention;

FIG. 2 is a cross-sectional view of a solar collector module of this invention taken on line 2—2 of FIG. 3;

FIG. 3 is a plan view of a solar collector module of this invention.

DETAILED DESCRIPTION OF THE DRAWINGS

With reference to FIG. 1, solar collecor 10 includes copper or copper alloy plate or sheet 11 and liquid water-resistant, thin, selective coating 12, which is of black copper oxide, i.e. CuO. Selective coating 12 has been conditioned by contact with chromic acid solution in accordance with this invention and has a stability, due to such conditioning, such that its selectivity is not significantly reduced after contact with liquid water condensate over a prolonged, cumulative, non-continuous time to excess of 1600 hours, usually in excess of 15,000 hours, e.g., about 17,000 hours or more, but which retains a solar absorptivity of 0.90 or higher and a thermal emissivity of no more than 0.20 after its contact with the water condensate over such prolonged time. Black copper oxide coating 12 comprises a multiplicity of discrete, generally conical-shaped (as shown) projections or protuberances of the copper oxide which are shown as enlarged or magnified in the enlarged, schematic showing of FIG. 1. These projections or protuberances of copper oxide are ordinarily of random varying shapes, lengths, and widths and are ordinarily not of uniform shape or configuration, length or width. Referring to FIGS. 2 and 3, solar collector module 14 includes copper or copper alloy plate 11, the conditioned, liquid water condensate-resistant selective coating 12, metal tubes 15, such as copper tubes, adapted to contain water mounted in direct contact with selective coating 12, transparent cover sheet 16, e.g. of transparent glass, and heat insulating material 17, e.g. Styrofoam multicellular polystyrene, in contact with and secured in assembly with plate 11. Tubes 15 are usually also coated with the conditioned, liquid water-resistant, selective coating or film 12. Transparent sheet 16 is mounted and secured in structural members 18 of wood or metal. A supply manifold feeds cool water to tubes 15 for heating, and a withdrawal or return manifold conducts the heated water from tubes 15 for utilization as desired.

Alternatively, tubes 15 can be mounted beneath copper or copper alloy plate 11 and in direct contact with plate 11. In such case tubes 15 would be enveloped for the most part by insulation material 17.

The conditioned, selective coating of this invention, which has been conditioned by treatment with the chromic acid solution, also has excellent stability to contact with water in gaseous or vapor form and is thermally stable at elevated temperatures up to the maximum durability temperature of the selective surface.

DESCRIPTION OF THE PREFERRED EMBODIMENTS

The chromic acid solution preferably utilized for the stabilizing treatment herein is a chromic acid solution containing alkali phosphate, chromic anhydride and an aqueous liquid solvent such as water. Such chromic acid solution is prepared by mixing together about 1 to 20 lbs. of a concentrate composition comprising, by weight, about 30 to 60% of chromic anhydride and about 70 to 40% of sodium tripolyphosphate per 100 gallons of the aqueous liquid such as water. An especially preferred chromic anhydride-sodium tripolyphosphate concentrate for mixing together with water in preparing the chromic acid solution is the following:

|  | % by Weight |
| --- | --- |
| $CrO_3$ | 45 |
| Sodium tripolyphosphate | 55 |

Such concentrate is mixed together with the aqueous liquid such as water in the proportions of 1 to 20 lbs. of the concentrate per 100 gallons of water.

Preferred blackening solutions employed herein are those obtained by mixing 1½ lbs. of either of the solid blackener concentrates A and B which follow, per gallon of water.

| Blackener Concentrate A | |
| --- | --- |
|  | by Weight |
| Sodium hydroxide | 66% |
| Sodium chlorite | 34% |

| Blackener Concentrate B | |
| --- | --- |
|  | by Weight |
| Sodium hydroxide | 50% |
| Sodium chlorite | 50% |

What is claimed is:

1. A solar collector comprising a base of copper or copper alloy, and a stable, selective, solar heat energy-absorptive coating on the base, said selective solar heat energy-absorptive coating comprising a multiplicity of discrete projections of copper oxide, said selective, solar heat energy-absorptive coating having been rendered stable by contacting the selective, solar heat energy-absorptive coating on the base with a chromic acid solution comprising chromic anhydride (Cr $O_3$) and water for a time sufficient to impart to thee selective coating a stability such that its selectivity is not significantly reduced after contact with liquid water over a prolonged, cumulative, non-continuous time in excess of 1600 hours.

2. The collector of claim 1 wherein the selective, solar heat energy-absorptive coating on the base has a solar absorptivity of at least 0.90 and an infrared emissivity no more than 0.20 prior to the stabilizing treatment with the chromic acid solution.

3. The collector of claim 2 wherein the stability imparted to the selective film is such that its selectivity is not significantly reduced after contact with liquid water condensate over a prolonged, cumulative, non-continuous time in excess of 15,000 hours.

4. The collector of claim 3 wherein the selective coating is contacted with the chromic acid solution for a time in the range of about 10 seconds to about 60 seconds.

5. The collector of claim 1 wherein the chromic acid solution comprises sodium phosphate, chromic anhydride, and water.

6. The collector of claim 5 wherein the chromic acid solution comprises, per each 100 gallons of water, about 1 to about 20 lbs. of a concentrate composition comprising, by weight, about 30 to about 60% of chromic anhydride and about 70 to about 40% of the sodium phosphate.

7. The collector of claim 5 wherein the sodium phosphate is sodium tripolyphosphate.

8. The collector of claim 6 wherein the sodium phosphate is sodium tripolyphosphate.

9. The collector of claim 1 wherein the chromic acid solution comprises about 0.1 to about 5.0 lbs. of chromic anhydride per each 100 gallons of water.

10. The collector of claim 1 wherein the temperature of the chromic acid solution during the stabilizing contacting treatment is in the range of from room temperature to boiling temperature.

11. The collector of claim 1 wherein the selective coating is contacted with the chromic acid solution for a time in the range of about 10 seconds to about 60 seconds.

12. The collector of claim 1 wherein the selective, solar heat energy-absorptive coating on the base is prepared by a process comprising contacting the copper or copper alloy base with a hot aqueous solution comprising an alkali metal chlorite, an alkali metal hydroxide and water at a solution temperature in the range of about 140° F. to about 220° F. for a time sufficient to obtain a selective film on the base having a solar absorptivity of at least 0.90 and an infrared emissivity no more than 0.20.

13. The collector of claim 12 wherein the chromic acid solution comprises sodium phosphate, chromic anhydride and water.

14. The collector of claim 13 wherein the chromic acid solution comprises, per each 100 gallons of water, about 1 to about 20 lbs. of a concentrate composition comprising, by weight, about 30 to about 60% of chromic anhydride and about 70 to about 40% of the sodium phosphate.

15. The collector of claim 14 wherein the sodium phosphate is sodium tripolyphosphate.

16. The collector of claim 12 wherein the chromic acid solution comprises about 0.1 to about 5.0 lbs. of chromic anhydride per each 100 gallons of water.

17. The collector of claim 12 wherein the alkali metal chlorite is sodium chlorite and the alkali metal hydroxide is sodium hydroxide.

18. The collector of claim 17 wherein the chromic acid solution comprises sodium phosphate, chromic anhydride and water as solvent therefor.

19. The collector of claim 18 wherein the chromic acid solution comprises, per each 100 gallons of water, about 1 to about 20 lbs. of a concentrate composition comprising, by weight, about 30 to about 60% of chromic anhydride and about 70 to about 40% of the sodium phosphate.

20. The collector of claim 19 wherein the sodium phosphate is sodium tripolyphosphate.

21. The collector of claim 20 wherein the temperature of the chromic acid solution is in the range of from room temperature to boiling temperature.

22. The collector of claim 21 wherein the selective coating is contacted with the chromic acid solution for a time in the range of about 10 seconds to about 60 seconds.

23. The collector of claim 20 wherein the temperature of the chromic acid solution during the contacting is in the range of room temperature to boiling temperature.

24. The collector of claim 23 wherein the selective coating is contacted with the chromic acid solution for a time in the range of about 10 seconds to about 60 seconds.

25. The collector of claim 20 having a plurality of metallic tubes adapted to contain heat-transfer fluid in contact with the selective surface.

26. The collector of claim 25 wherein the fluid is water.

27. The collector of claim 25 having a layer of thermal insulation material on the side of the base opposite the selective coating.

28. The collector of claim 25 wherein a sheet of transparent material is retained above the selective surface, and in spaced relationship thereto.

29. The collector of claim 25 also having the stable, selective, solar heat energy absorptive coating on at least the exposed external surfaces of the tubes.

30. The collector of claim 25 wherein the tubes are of copper or copper alloy.

* * * * *